(12) United States Patent
Krout et al.

(10) Patent No.: US 6,883,835 B2
(45) Date of Patent: Apr. 26, 2005

(54) POLYFUSION PIPE REPAIR SYSTEM AND METHOD

(75) Inventors: Jeffrey L. Krout, Fort Worth, TX (US); Mitchell D. Giannola, North Richland Hills, TX (US)

(73) Assignee: Basic Resources, Inc., Dallas, TX (US)

( * ) Notice: Subject to any disclaimer, the term of this patent is extended or adjusted under 35 U.S.C. 154(b) by 0 days.

(21) Appl. No.: 09/800,387

(22) Filed: Mar. 5, 2001

(65) Prior Publication Data

US 2002/0121777 A1 Sep. 5, 2002

(51) Int. Cl.$^7$ ............................ F16L 55/18; F16L 47/03
(52) U.S. Cl. ........................ 285/15; 285/21.1; 285/21.2; 138/97; 138/99
(58) Field of Search ........................ 285/15, 21.1, 21.2; 138/97, 98, 99

(56) References Cited

U.S. PATENT DOCUMENTS

| | | | |
|---|---|---|---|
| 1,858,101 A | * | 5/1932 | McAfee ...................... 285/114 |
| 2,236,913 A | | 4/1941 | Merrill |
| 2,276,443 A | | 3/1942 | Wilson |
| 3,117,904 A | | 1/1964 | Black |
| 3,394,025 A | | 7/1968 | McCune |
| 3,487,857 A | | 1/1970 | Lee |
| 3,753,766 A | | 8/1973 | Brown et al. |
| 4,041,720 A | | 8/1977 | Lebourg |
| 4,047,659 A | | 9/1977 | Vucic |
| 4,049,480 A | | 9/1977 | Kutschke |
| 4,186,475 A | | 2/1980 | Jönsson |
| 4,218,812 A | | 8/1980 | Jönsson |
| 4,253,497 A | | 3/1981 | Martin et al. |
| 4,257,446 A | | 3/1981 | Ray |
| 4,342,338 A | | 8/1982 | Glennie |
| 4,357,960 A | | 11/1982 | Han |
| 4,413,765 A | | 11/1983 | Tracy |
| 4,437,494 A | | 3/1984 | Soper et al. |
| 4,486,650 A | * | 12/1984 | Bridgstock et al. ......... 219/544 |
| 4,492,095 A | | 1/1985 | Brister |
| 4,505,295 A | | 3/1985 | Quin et al. |
| 4,556,580 A | | 12/1985 | Kamuro et al. |
| 4,571,488 A | * | 2/1986 | Reeves ........................ 219/544 |
| 4,584,963 A | | 4/1986 | Morinaga et al. |
| 4,610,439 A | | 9/1986 | Burghardt |
| 4,639,580 A | | 1/1987 | Johnson |
| 4,727,242 A | | 2/1988 | Barfield |
| 4,770,442 A | * | 9/1988 | Sichler ......................... 285/21 |
| 4,807,340 A | | 2/1989 | Fuller et al. |
| 4,929,817 A | | 5/1990 | Mito et al. |
| 4,994,655 A | | 2/1991 | Handa et al. |
| RE33,716 E | | 10/1991 | Johnson |
| 5,062,207 A | | 11/1991 | Martin et al. |

(Continued)

FOREIGN PATENT DOCUMENTS

| | | | | |
|---|---|---|---|---|
| DE | 29722603 | * | 4/1998 | |
| JP | 405180391 A | * | 7/1993 | ................. 138/99 |
| WO | WO9919135 | * | 4/1999 | |

OTHER PUBLICATIONS

Pending U.S. patent application (including claims and drawings) filed with the US Patent and Trademark Office on Apr. 18, 2002, Attorney Docket No. 82274.472021, Ser. No. (not assigned).
Picture entitled "Die Revolution im Graben!".

*Primary Examiner*—David Bagnell
*Assistant Examiner*—G M Collins
(74) *Attorney, Agent, or Firm*—Hunton & Williams LLP

(57) ABSTRACT

An apparatus and method for sealing a leak in a plastic pipe is provided. The apparatus includes a body and an electrofusion element. The body is constructed of a substantially rigid material and has an upper surface and a lower surface. The lower surface is adapted to be positionable about at least a leak portion of a plastic pipe. The electrofusion element is disposed about the lower surface of the body and operable to sealably couple with the plastic pipe to encapsulate the leak.

16 Claims, 3 Drawing Sheets

U.S. PATENT DOCUMENTS

| | | |
|---|---|---|
| 5,101,545 A | 4/1992 | Mori et al. |
| 5,116,082 A | 5/1992 | Handa et al. |
| 5,125,690 A | 6/1992 | Taylor et al. |
| 5,127,116 A | 7/1992 | Greig |
| 5,150,922 A | 9/1992 | Nakashiba et al. |
| 5,280,670 A | 1/1994 | Toomey et al. ............. 29/33 T |
| 5,321,233 A | 6/1994 | Barrett et al. |
| 5,363,541 A | 11/1994 | Toomey et al. |
| 5,365,977 A | 11/1994 | Goad et al. |
| 5,496,076 A | 3/1996 | Lin |
| 5,542,713 A | 8/1996 | Miyazaki et al. |
| 5,573,283 A | 11/1996 | Sellers et al. |
| 5,670,012 A | 9/1997 | Porfido et al. |
| 5,722,463 A | 3/1998 | Smyth et al. |
| 5,730,472 A | 3/1998 | Krause et al. ............. 285/21.1 |
| 5,781,995 A | 7/1998 | Anna et al. |
| 5,895,543 A | 4/1999 | Stiles ...................... 156/274.2 |
| 5,915,420 A | 6/1999 | Dwight, Jr. et al. |
| 5,916,468 A | 6/1999 | Akiyama et al. |
| 5,951,902 A | 9/1999 | Goodman et al. .......... 219/544 |
| 6,236,026 B1 * | 5/2001 | Schafstein et al. .......... 219/535 |
| 6,237,640 B1 * | 5/2001 | Vanderlee .................... 138/99 |
| 6,331,698 B1 * | 12/2001 | Hintzen ..................... 219/535 |

* cited by examiner

POLYFUSION PIPE REPAIR SYSTEM AND METHOD

TECHNICAL FIELD OF THE INVENTION

This invention relates in general to the field of repairing plastics that transport gas or other substances under pressure and more particularly, but not by way of limitation, to an electrofusion apparatus and method for repairing leaks in a plastic pipe.

BACKGROUND OF THE INVENTION

Plastic pipes are widely used to transport natural gas under pressure. The plastic pipes are often made of polyethylene or other types of plastic that occasionally develop leaks and must be repaired.

The conventional form of repairing leaks in plastic pipes transporting natural gas involves an expensive and time consuming process. First, a large excavation is required to make the leak accessible for repair. Two clamps are then placed on the plastic pipe, one on either side of the leak. The clamps are caused to compress the plastic pipe, thereby sealing the plastic pipe and isolating the leak.

Unfortunately, squeezing the plastic pipe causes weakening of the pipe walls and makes the squeezed points vulnerable to cracking, leaking, and breakage. Also, plastic pipes with a diameter of six inches or more cannot be squeezed effectively because the large diameter cannot be compressed sufficiently to seal the flow of gas passing through the plastic pipe. Also, even where the clamp appear successful, leaking gas may occur and go undetected which produces a serious safety concern to those working on the plastic pipe repair.

Conventional repair includes employing a pair of saddle taps which are fused onto the plastic pipe near the clamps and caused to tap into the pipe to communicate with the flow of natural gas. A bypass is constructed including connecting a bypass line between the saddle taps. With the flow of natural gas restored through the bypass and the leak isolated, the leak portion of plastic pipe is removed by cutting the plastic pipe. The process also includes removing burrs that were caused by cutting the plastic pipe. A replacement section of plastic pipe is fitted and connected with collars to the existing plastic pipe near the clamps. Several other time consuming step are then necessary to complete the repair, including remove the bypass, to ready the plastic pipe for natural gas transportation. Consequently, the time, cost and effort required to repair plastic pipes under pressure shows that there is a need for an alternative approach to repairing leaks in plastic pipes.

Thus, a need exists for a safer and less expensive apparatus and method of repairing plastic pipe that may be rapidly implemented, while eliminating the dangers of leaking gas or further damaging the plastic pipe. It is to such an apparatus and method for repairing plastic pipe that the present invention is directed.

SUMMARY OF THE INVENTION

The present invention provides an apparatus for use in repairing a leak in a plastic pipe, the apparatus including a body and an electrofusion element. The body is constructed of a substantially rigid material and has an upper surface and a lower surface. The lower surface is adapted to be positionable about at least a leak portion of a plastic pipe. The electrofusion element is disposed about the lower surface of the body and operable to sealably couple with the plastic pipe to encapsulate the leak.

In another embodiment, the present invention provides an apparatus for use in repairing a leak in a plastic pipe, the apparatus including a body and an electrofusion element. The body is constructed of a substantially rigid material and has an upper surface and a lower surface. The lower surface is adapted to be positionable about at least a leak portion of a plastic pipe.

The electrofusion element is disposed about the lower surface of the body such that the electrofusion element substantially defines a perimeter positionable adjacent the leak portion of the plastic pipe to sealably couple with the plastic pipe to encapsulate the leak.

The apparatus further includes a fastener and a terminal electrically connected to the electrofusion element operable to energize the electrofusion element. The fastener is operable to secure the apparatus to the plastic pipe.

In yet another embodiment, the present invention provides an apparatus for use in repairing a leak in a plastic pipe. The apparatus includes a first portion and a second portion. The first portion has a first pipe engaging electrofusion surface, a second pipe engaging electrofusion surface, a first contact surface, and a second contact surface.

The second portion has a first pipe engaging electrofusion surface, a second pipe engaging electrofusion surface, a first contact surface, and a second contact surface. The first portion and the second portion are operable to encapsulate the leak. The first pipe engaging electrofusion surfaces of the first and second portions are operable to couple around the pipe to form a first seal. The second pipe engaging electrofusion surfaces of the first and second portions are operable to couple around the pipe to form a second seal.

The first contact surfaces of the first and second portions are operable to sealably couple with one another. The second contact surfaces of the first and second portions are operable to sealably couple with one another.

In one embodiment the present invention provides a method for sealing a leak in a plastic pipe comprising providing an apparatus having a first portion and a second portion. The first portion has a first pipe engaging electrofusion surface, a second pipe engaging electrofusion surface, a first contact surface, and a second contact surface.

The second portion has a first pipe engaging electrofusion surface, a second pipe engaging electrofusion surface, a first contact surface, and a second contact surface. The first portion and the second portion are operable to encapsulate the leak. The first pipe engaging electrofusion surfaces of the first and second portions are operable to couple around the pipe to form a first seal. The second pipe engaging electrofusion surfaces of the first and second portions are operable to couple around the pipe to form a second seal.

The first contact surfaces of the first and second portions are operable to sealably couple with one another. The second contact surfaces of the first and second portions are operable to sealably couple with one another.

The method further includes encapsulating the leak in the plastic pipe with the a first portion and a second portion of the apparatus. The method provides for electrofusing the first portion and the second portion together at first contact surfaces and electrofusing the first portion and the second portion together at second contact surfaces. The method further includes electrofusing the first portion and the second portion at first pipe engaging electrofusion surfaces, and electrofusing the first portion and the second portion at second pipe engaging electrofusion surfaces.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
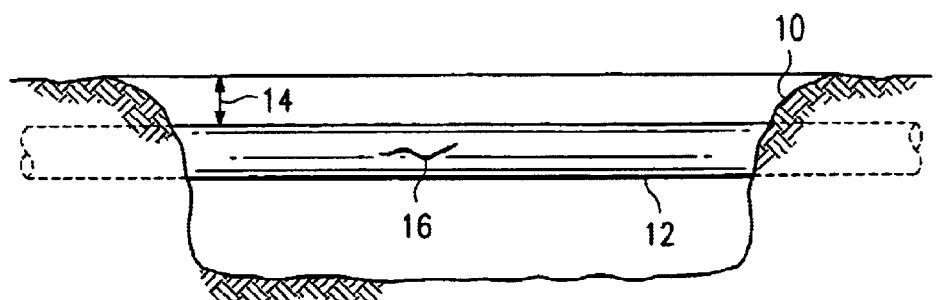
FIG. 1 is a perspective view of an excavation revealing a plastic pipe with a leak.

FIG. 1 illustrates an excavation 10 whereby dirt has been removed from the ground to reveal a plastic pipe 12 which has been buried underground. The plastic pipe 12 may be composed of high-strength plastic, such as polyethylene or other plastics suitable for electrofusing. The plastic pipe 12 may be used for a variety of purposes such as for example transporting natural gas to consumers. The plastic pipe 12 is buried at a depth 14 suitable to satisfy the safety standards for transporting natural gas under pressurized conditions.

The plastic pipe 12 is shown having a leak 16 which may have developed from a variety of causes. Upon initial awareness of the leak 16, the repair must begin by preparing the excavation 10 of the ground surrounding the plastic pipe 12 to locate the leak 16. A suitable amount of ground must be removed to expose the plastic pipe 12 such that the workers may gain access to the leak 16. It will be appreciated that a pressurized pipe, such as the plastic pipe 12, leaking natural gas presents an extremely hazardous situation.

Figure 2:
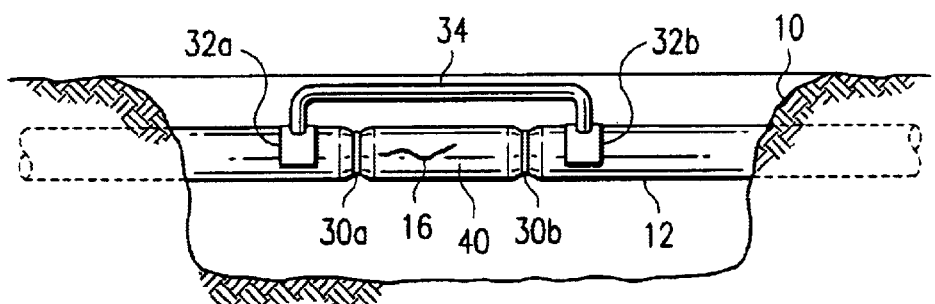
FIG. 2 is a perspective view of a prior art clamp and bypass method of repairing the leak in the plastic pipe detailed in FIG. 1.

FIG. 2 is a perspective view detailing the prior art practice of repairing the leak 16 in the plastic pipe 12 as shown in FIG. 1. As previously discussed, the prior art process includes providing a device 30 capable of clamping or pinching the plastic pipe 12 adjacent both sides of the leak 16. The device 30, which has been denoted alpha-numerically for purposes of clarity as 30a and 30b, is placed on the plastic pipe 12 and caused to compress the plastic pipe 12 so as to seal the plastic pipe 12 to prevent natural gas or other fluids from being communicated therebetween. By placing the device 30a adjacent one side of the leak 16 and the device 30b adjacent the other side of the leak 16 on the plastic pipe 12 it can be seen that the natural gas flowing through the plastic pipe 12 is isolated from the leak 16.

Unfortunately, the device 30 causes irreparable damage to the plastic pipe 12 at the point upon which the device compresses the plastic pipe 12. The integrity of the plastic pipe 12 at these points is forever compromised and may be the location of leaks that subsequently develop in the plastic pipe 12. Also, the plastic pipe 12 may not be clamped or pinched at this point in the future because of the likelihood that the plastic pipe 12 cannot withstand this process more once without developing leaks, fractures, or breaking.

Once the leak 16 has been isolated with the devices 30a and 30b, a pair of saddle taps 32, denoted alpha-numerically 32a and 32b for purposes of clarity, are placed on the plastic pipe 12 adjacent the devices 30a and 30b. The saddle taps 32 are electrofused to the pipe and caused to communicate with the natural gas within the plastic pipe 12. A bypass line 34 is connected between the saddle taps 32a and 32b so as to allow the flow of natural gas along the plastic pipe 12 to restore service of the natural gas to the customers during the repair process.

The prior art process thereafter includes a time consuming and expensive process of removing the leak section 40 of the plastic pipe 12 by physically cutting the leak section 40 from the plastic pipe 12 and preparing the remaining cut portions of the plastic pipe 12. A replacement section (not shown) is then positioned in the place of the leak section 40 which was removed and fitted with materials to retain the new section, such as glue, epoxy, collars, or other means of attaching plastic pipe pieces to one another (not shown). Thereafter, the bypass line 34 is removed, but the saddle-taps 32a and 32b are left in place as required to ensure the integrity of the plastic pipe 12.

Therefore, it can be appreciated that this process is time consuming, expensive, and inefficient, in that the plastic pipe 12 at the points where the devices 30a and 30b clamp or pinch the plastic pipe 12 damage the plastic pipe and increase the likelihood of a subsequent leaks developing. For this reason it can be appreciated that a improved apparatus and method for repairing leaks in plastic pipes is needed and necessary which eliminates the disadvantages discussed with reference to FIG. 2.

Figure 3:
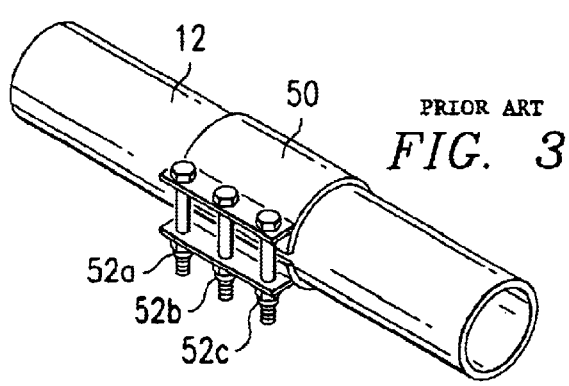
FIG. 3 is a perspective view of a clamp mounted on a plastic pipe with a leak.

FIG. 3 is a perspective view of a prior art clamp 50 mounted on plastic pipe, such as the plastic pipe 12 shown in FIG. 1, having a leak (not shown) that is covered by the clamp 50. The prior art clamp 50 is a simple belting device secured about the pipe 12 with a plurality of fasteners 52, denoted alpha-numerically 52a, 52b, and 52c for purposes of clarity. The fasteners 52 are shown as a nut-and-bolt configuration, however, any fasteners 52 adapted to secure the clamp in a belting fashion about the pipe 12 are satisfactory.

The purpose of the prior art clamp 50 is to reduce or eliminate the natural gas flowing through the plastic pipe from escaping via the leak 16. Although the clamp 50 does not provide a permanent seal satisfactory to repair the leak 16, the clamp 50 does provide a method of substantially reducing the amount of natural gas from escaping from the plastic pipe 12 during the repair process for the purposes of health and safety of the workers and the surrounding community. The clamp 50 may be employed in the prior art repair process as shown above with reference to FIG. 2, as well as being required by certain community and municipal safety regulations when making such repairs.

Figure 4:
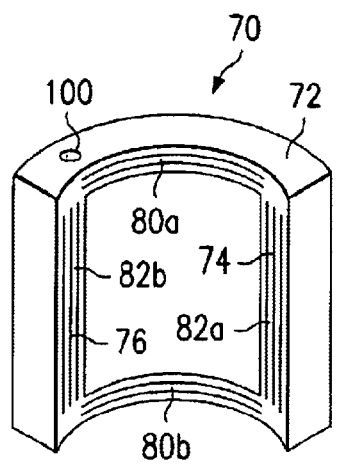
FIG. 4 is a perspective view of one embodiment of an apparatus constructed in accordance with the present invention for use in repairing a leak in plastic pipe.

FIG. 4 illustrates an apparatus 70 used to repair leaks in plastic pipe, such as the plastic pipe 12 (See FIG. 1), constructed in accordance with the present invention. The apparatus 70 includes a body 72 constructed of a substantially rigid material such as metal or a polymeric material. The body 72 is provided with a lower surface 74 adapted to be positionable about at least a leak portion of a plastic pipe. The apparatus 70 further includes an electrofusion element 76 disposed about the lower surface 74 of the body 72. The electrofusion element is operable to sealably couple with the plastic pipe to encapsulate the leak.

It can be seen that the lower surface 74 of the body is provided with a plurality of surfaces adapted to conform to the outer surface of the plastic pipe 12. That is, the lower surface 74 is provided with a first and second arched surface 80, denoted alpha-numerically as 80a and 80b for purposes of clarity. The arched surfaces 80a and 80b are shaped to conform to the rounded configuration of the plastic pipe 12. The lower surface 74 of the body is further provided with a first and second lateral surfaces 82, denoted alpha-numerically 82a and 82b for purposes of clarity. The lateral surfaces 82 are adapted to conform to the arcuate slope along the length of the plastic pipe 12.

Figure 5:
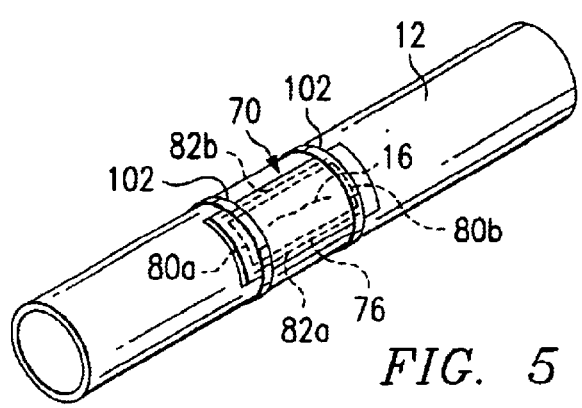
FIG. 5 is a perspective view of the apparatus detailed in FIG. 4 shown attached about the leak portion of the plastic pipe.

Referring also to FIG. 5, the apparatus 70 is shown disposed over the leak 16 portion of plastic pipe 12, such as the plastic pipe 12 (see FIG. 1). As such, the arched surfaces 80a and 80b of the apparatus 70 can be seen placed about the rounded outer portion of the plastic pipe 12 while the lateral surfaces 82a and 82b of the apparatus 70 are shown as being in contact with the arcuate length of the plastic pipe 12. It can be seen that when the apparatus is so disposed upon the plastic pipe 12, the electrofusion element 76 substantially defines a parameter which has been positioned adjacent to the leak portion of the plastic pipe.

The electrofusion element 76 on the lower surface 74 may then be energized to electrofuse the lower surface 74 to the surface of the plastic pipe 12. The process of electrofusing polypropylene surfaces to one another is well known to one of ordinary skill in the art of electrofusion and thus no further discussion regarding electrofusion is deemed necessary in order to enable one of ordinary skill in the art how to make and use the apparatus 70 in accordance with the present invention.

To accomplish the electrofusion process, the apparatus may be provided with a terminal 100 (see FIG. 4) electrically connected to the electrofusion element 76 and operable to energize the electrofusion element 76.

Although the electrofusion element 76 has the effect of securing the apparatus 70 to the plastic pipe 12, the apparatus 70 may further be provided with one or more fasteners 102 operable to secure the apparatus 70 to the plastic pipe 12. The fasteners 102 are shown as belt fasteners extending about the body 72 of the apparatus 70 and about the plastic pipe 12. However, a variety of configurations will suffice for this purpose, such as clamps or nut-an-bolt configuration. It will be appreciated that the apparatus 70 may be shaped in various configurations such that the body 72 is substantially rectangular or substantially cylindrical (not shown) as may be more desirable under varying circumstances which will readily suggest themselves to one of ordinary skill in the art.

Figure 6:
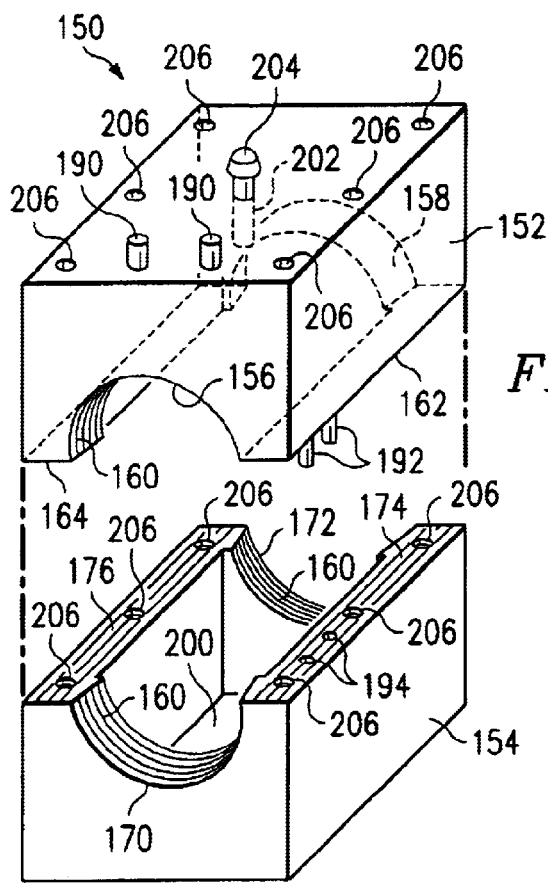
FIG. 6 is a perspective view of one embodiment of an apparatus constructed in accordance with the present invention provided with two portions adapted to encapsulate a leak in plastic pipe.

FIG. 6 illustrates another embodiment of an apparatus 150 for use in repairing a leak in a plastic pipe. The apparatus 150 includes a first portion 152 and a second portion 154. The first portion 152 is provided with a first and second pipe engaging electrofusion surfaces 156 and 158. The first and second pipe engaging electrofusion surfaces 156 and 158 are shaped to receive the rounded outer portion of the plastic pipe 12 and are provided with electrofusion elements 160 adapted to sealably electrofuse to polypropylene surfaces, such as the plastic pipe 12. The first portion 152 is further provided with a first and a second contact surface, 162 and 164 respectively, both of which are provided with the electrofusion elements 160.

The second portion 154 is provided with a first and a second pipe engaging electrofusion surface 170 and 172 respectively. The first and second pipe engaging electrofusion surfaces 170 and 172 are similarly provided with electrofusion elements 160. The second portion 154 is further provided with a first and a second contact surface 174 and 176, respectively. The first and second contact surfaces 174 and 176 of the second portion 154 are further provided with electrofusion elements 160. The first and second pipe engaging electrofusion surfaces 170 and 172 of the second portion are adapted to conform to the rounded outer portion of a plastic pipe 12 so as to conform thereto.

It can seen that the first portion 152 and the second portion 154 are operable to encapsulate a plastic pipe 12 and the leak 16 portion thereon the plastic pipe 12. The first pipe engaging electrofusion surfaces 156 and 170 of the first and second portions 152 and 154 are operable to couple around the plastic pipe 12 to form a first seal. The second pipe engaging electrofusion surfaces 158 and 172 of the first and second portions 152 and 154 are operable to couple around the plastic pipe 12 to form a second seal. The first contact surfaces 162 and 174 of the first and second portions 152 and 154 are operable to sealably couple with one another while the second contact surfaces 164 and 176 of the first and second portions 152 and 154 are operable to sealably couple with one another as well.

The apparatus 150 further includes a plurality of terminals 190 operable to energize the electrofusion elements 160 provided on the first portion 152 and the second portion 154. In the present embodiment, the terminals 190 are operable to energize the electrofusion elements on the first portion 152 and are electrically coupled to a pair of prongs 192 extending from the first contact surface 162 of the first portion 152. The prongs 192 on the first portion 152 are adapted to mate with mating contacts 194 provided on the second portion 154.

The mating contacts 194 are operable to receive electricity communicated from the terminals 190 to the prongs 192 and communicate such electricity to the electrofusion elements 160 provided on the second portion 154, via the mating contacts 194.

The apparatus 150 is further provided with a cavity 200 defining the interior of the first portion 152 and second portion 154. The cavity 200 within the apparatus 150 may be of various configurations, however, the cavity 200 should provide sufficient clearance to enable the apparatus 150 to be placed about the plastic pipe 12 having the clamp 50 (see FIG. 3). In this manner, the apparatus 150 may be used without removing the clamp 50, which is one advantage to the present invention.

An opening 202 extending through the first portion 152 communicates with the cavity 200 within the apparatus 150 when the first portion 152 and second portion 154 are engaged with one another. The opening 202 is further provided with a cap 204 operable to close the opening 202 to prevent communication through the opening 202 from the cavity 200.

The apparatus is further provided with a plurality of holes 206 which extend through the first portion 152 and second portion 154 and which are brought into alignment with one another when the first and second portions 152 and 154 are engaged. The holes 206 are provided as a means of securing the first portion 152 to the second portion 154 by use of any common fastener such as a nut-and-bolt configuration or a threaded screw. However, it should be understood that any means of securing the first portion 152 to the second portion 154 may be utilized, such as with a belt or strap fastener, and remain within the spirit and scope of the present embodiment.

Furthermore, the first portion 152 and the second portion 154 may be provided with flanges (not shown) which extend from the first and second pipe engaging electrofusion surfaces 156, 158, 170, and 172, and/or the first and second contact surfaces 162, 164, 174 and 176 of the first and second portions 152 and 154. In this manner, the flanges may be engaged to one another and fasteners, such as a nut-and-bolt configuration, may be used to thereby secure the first portion 152 to the second portion 154 by anchoring such flanges.

Figure 7:
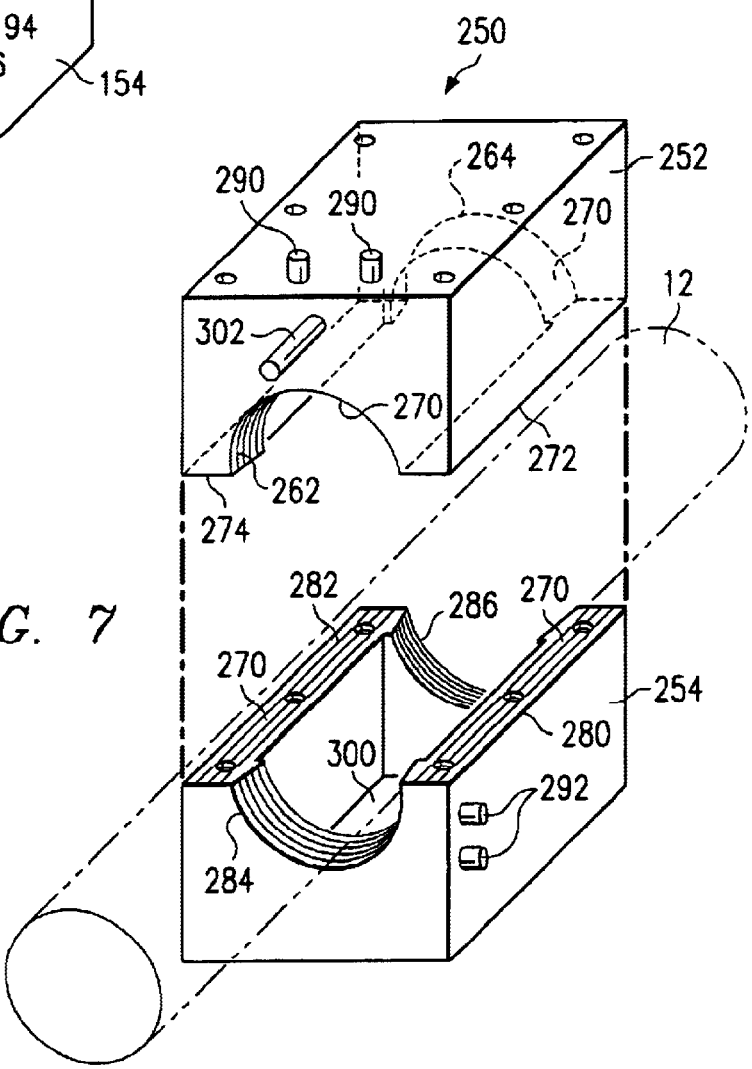
FIG. 7 is a perspective view of another embodiment of an apparatus with two portions for use in repairing leaks in plastic pipe with the plastic pipe shown in phantom.

FIG. 7 illustrates another embodiment of an apparatus 250 constructed in accordance with the present invention for use in repairing the plastic pipe 12. In this embodiment, the apparatus 250 is provided with a first portion 252 and a second portion 254, the first and second portions 252 and 254 are constructed substantially similar to the first and second portions 152 and 154 of the apparatus 150 described and shown in FIG. 6.

The first portion 252 is provided similarly with a first and second pipe engaging electrofusion surface 262 and 264 which are provided with electrofusion elements 270. However, a first and second contact surfaces 272 and 274 are not provided with electrofusion elements 270. Rather, the second portion 254 is provided with a first and second contact surface 280 and 282, respectively, which are provided with electrofusion elements 270. Similarly, the second portion 254 is provided with a first and second pipe engaging electrofusion surfaces 284 and 286 provided with electrofusion elements 270.

The first portion 252 is provided with terminals 290 operable to energize the electrofusion elements 270 provided on the first and second pipe engaging electrofusion surfaces 262 and 264 to electrofuse to the surfaces to the plastic pipe 12. The second portion 254 is provided with terminals 292 operable to energize the first and second pipe engaging electrofusion surfaces 284 and 286 to the plastic pipe 12. Additionally, this energizes the first and second contact surfaces 280 and 282 of the second portion 254 to electrofuse the first and second contact surfaces 272 and 274, respectively, of the first portion 252. In this manner, the first and second portions 252 and 254 are electrofused together similar to that shown in FIG. 6., however, requiring fewer electrofusion elements.

It will be appreciated that a considerable number of combinations of placements of the electrofusion elements 270 on various surfaces, as well as, terminal placement and combinations are possible and still within the spirit and scope of the invention.

The apparatus 250 is further provided with a cavity 300 within the apparatus 250 wherein the first portion 252 and second portion 254 are engaged about the plastic pipe 12. An opening 302 in the first portion 252 communicates with the cavity 300. The purpose of the opening is to enable leak testing to determine the extent of the leak. Once the leak has been encapsulated, natural gas in the cavity may be sampled via the opening 302.

It should be appreciated that the opening 302, for the purpose of testing the gas levels within the apparatus 250, may be more useful when placed elsewhere on the apparatus 250 depending upon the circumstances. However, placement of the opening 302, as well as various configurations of the diameter and closure or capping option of the opening 302 are within the spirit and scope of the invention as described and disclosed herein.

Figure 8:
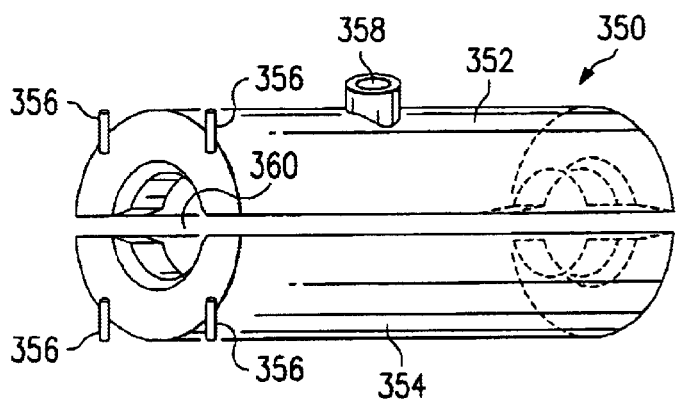
FIG. 8 is a perspective view of another embodiment of an apparatus for use in repairing leaks in plastic pipe.

FIG. 8 illustrates another embodiment of an apparatus 350 constructed in accordance with the present invention having a first portion 352 and a second 354. The first portion 352 and the second portion 354 are substantially similar in construction and function to the first portion 152 and second portion 154 of the apparatus 150 (see FIG. 6). The first portion 352 and second portion 354 of the apparatus 350 are substantially cylindrical in shape and are provided with a plurality of terminals 356 operable to energize the electrofusion elements (not shown) provided thereon.

The first portion 352 of the apparatus 350 is further provided with an opening 358 which extends through the first portion 352 and communicates with a cavity 360 within the apparatus 350 when the first portion 352 and second portion 354 are engaged with one another. The cylindrical configuration of the apparatus 350 may be useful for working within the confines of the excavation 10 (see FIG. 1). In addition, this configuration may provide optimum clearance within the cavity 360 for devices on the plastic pipe 12, such as the clamp 50 (see FIG. 3).

Figure 9:
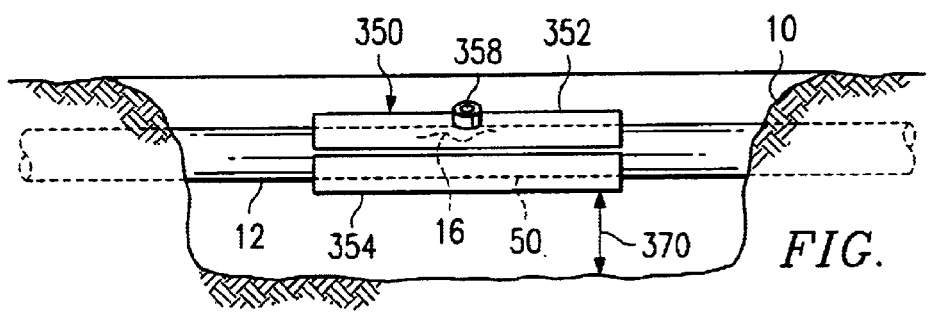
FIG. 9 is a perspective view illustrating the apparatus described in FIG. 8 employed to repair a leaks in plastic pipe.

FIG. 9 illustrates the apparatus 350 shown in FIG. 8 employed to repair a leak in a plastic pipe 12. The clamp 50 has been placed over the leak 16 in the plastic pipe 12 so as to reduce the flow of natural gas escaping from the leak 16 in the plastic pipe 12. The apparatus 350 is then disposed such that the first portion 352 surrounds a first half of the plastic pipe 12 including the clamp 50 and the second portion 354 surrounds a second half of the plastic pipe 12 including the clamp 50.

It will be appreciated that disposing the second portion 354 of the apparatus 350 requires less clearance 370 and thus less excavation of ground when preparing the plastic pipe 12 for the repair process. This is a considerable time and money savings toward repairing the leak 16. Additionally, the cavity 360 and the apparatus 350 is provided such that the first portion 352 and second portion 354 have ample clearance within the interior of the apparatus 350 so as to house not only the plastic pipe 12, but the clamp 50 and the components thereon the clamp 50.

Once the apparatus 350 has been electrofused to the plastic pipe 12 such that the first portion 352 and second portion 354 engage one another, the volume of natural gas continuing to leak from the leak 16 of the plastic pipe 12 through the clamp 50 may be gaged through the opening 358. Assuming a satisfactory seal has been attained, the apparatus may then be sealed by capping the opening 358 by crimping or sealing the opening 358.

Figure 10:
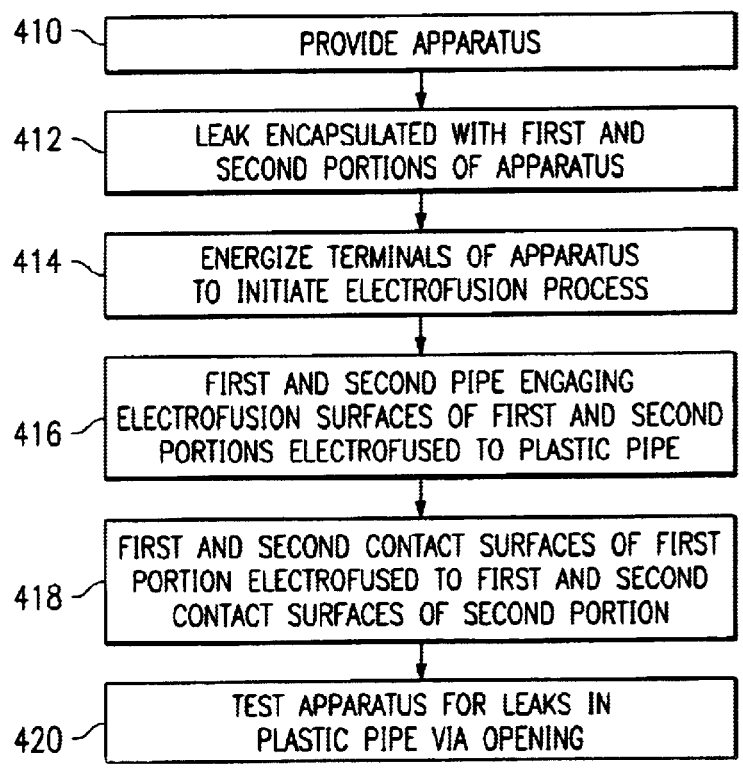
FIG. 10 is a flow chart detailing a method of repairing leaks in plastic pipes in accordance with the present invention.

FIG. 10 provides a flow chart 400 detailing a method of repairing leaks in plastic pipe in accordance with the present invention. At a first block 410, the method includes providing an apparatus, such as the apparatus 150 (see FIG. 6) having a first portion 152 and a second portion 154. At a block 412, the leak 16 in the plastic pipe 12 is encapsulated with the first portion 152 and the second portion 154 of the apparatus 150.

At a block 414, the terminals 190 are energized to initiate the electrofusion process. This includes providing electrical power to the terminals 190 which communicate with the relevant electrofusion elements 160 of the apparatus 150. At a block 416, the first and second pipe engaging electrofusion surfaces 156, 158, 170 and 172 of the first and second portions 152 and 154 are electrofused to the outer surface of the plastic pipe 12 adjacent the leak 16 of the plastic pipe 12.

At a block 418, the first and second contact surfaces 162 and 164 of the first portion 152 are electrofused to the first and second contact surfaces 174 and 176 of the second portion 154 for sealing engagement. At a block 420, the apparatus 150 is tested for natural gas communicating from the leak 16 of the plastic pipe 12 via the opening 202. This is accomplished by sampling the natural gas being communicated through the opening 202 in the apparatus 150 to determine the status of the natural gas within the cavity 200 of the apparatus 150. Thereafter, the opening 202 may be covered in a sealable manner and the apparatus 150 and plastic pipe 12 may be covered with the ground where necessary.

Thus, it is apparent that there has been provided, in accordance with the present invention, an apparatus and method for repairing leaks in plastic pipe that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various embodiments shown in the drawings herein illustrate that the present invention may be implemented and embodied in a variety of different ways that still fall within the scope of the present invention.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

What is claimed is:

1. An apparatus for use in repairing a leak in a plastic pipe, the apparatus comprising:
   a first portion having a first pipe engaging electrofusion surface, a second pipe engaging electrofusion surface, a first contact surface, and a second contact surface; and
   a second portion having a first pipe engaging electrofusion surface, a second pipe engaging electrofusion surface, a first contact surface, and a second contact surface wherein the first portion and the second portion are operable to encapsulate the leak, the first pipe engaging electrofusion surfaces of the first and second portions are operable to couple around the pipe to form a first seal, the second pipe engaging electrofusion surfaces of the first and second portions are operable to couple around the pipe to form a second seal, the first contact surfaces of the first and second portions are operable to sealably couple with one another, and the second contact surfaces of the first and second portions are operable to sealably couple with one another;
   a sealable vent coupled to the apparatus and in communication with the leak in the plastic pipe when the first and second portions are positioned to encapsulate the plastic pipe;
   a first terminal attached to the first portion;
   a second terminal electrically coupleable to the first terminal; and
   a communication line positioned to electrically couple the first and second portions when the first and second portions are positioned for engagement such that when electricity is applied to the first and second terminals, the electricity is communicated to energize the electrofusion surfaces of the first and second portions.

2. The apparatus of claim 1 wherein the first and second contact surfaces of the first portion are further provided with electrofusion elements operable to sealably couple the first contact surfaces of the first and second portions to one another and operable to sealably couple the second contact surfaces of the first and second portions to one another.

3. The apparatus of claim 1 wherein the first and second contact surfaces of the first and second portions are further provided with electrofusion elements operable to sealably couple the first contact surfaces of the first and second portions to one another and operable to sealably couple the second contact surfaces of the first and second portions to one another.

4. The apparatus of claim 1 wherein the apparatus further includes a fastener operable to secure the first and second portions to one another.

5. The apparatus of claim 4 wherein the first and second pipe engaging electrofusion surfaces and the first and second contact surfaces of the first portion define a sidewall providing a cavity within the first portion such that the cavity communicates with a leak portion of the plastic pipe.

6. The apparatus of claim 5 wherein the first portion is provided with a passageway defining an opening extending therethrough the first portion, the passageway in communication with the cavity of the first portion.

7. The apparatus of claim 5 wherein the first and second pipe engaging electrofusion surfaces and the first and second contact surfaces of the second portion define a sidewall providing a cavity within the second portion such that the cavity communicates with a leak portion of the plastic pipe.

8. The apparatus of claim 7 wherein the plastic pipe is a polyethylene pipe.

9. The apparatus of claim 1, further comprising a repair member provided on the plastic pipe to reduce the leak, and wherein the first and second portions are sized to couple around the plastic pipe so as to encapsulate the repair member and the plastic pipe.

10. The apparatus of claim 9, wherein the repair member is further defined as a clamp.

11. The apparatus of claim 9, wherein the repair member is further defined as a second electrofusion apparatus.

12. A method for sealing a leak in a plastic pipe comprising:
   providing an apparatus comprising:
      a first portion having a first pipe engaging electrofusion surface, a second pipe engaging electrofusion surface, a first contact surface, and a second contact surface, a second portion having a first pipe engaging electrofusion surface, a second pipe engaging electrofusion surface, a first contact surface, and a second contact surface wherein the first portion and the second portion are operable to encapsulate the leak, the first pipe engaging electrofusion surfaces of the first and second portions are operable to couple around the pipe to form a first seal, the second pipe engaging electrofusion surfaces of the first and second portions are operable to couple around the pipe to form a second seal, the first contact surfaces of the first and second portions are operable to sealably couple with one another, and the second contact surfaces of the first and second portions are operable to sealably couple with one another, a sealable vent coupled to the apparatus and in communication with the leak in the plastic pipe when the first and second portions are positioned to encapsulate the plastic pipe, a first terminal attached to the first portion, a second terminal electrically coupleable to the first terminal, a communication line positioned to electrically couple the first and second portions when the first and second portions are positioned for engagement such that when electricity is applied to the first and second terminals, the electricity is communicated to energize the electrofusion surfaces of the first and second portions; and encapsulating the leak in the plastic pipe with the a first portion and a second portion;

electrofusing the first portion and the second portion together at the first contact surfaces;

electrofusing the first portion and the second portion together at the second contact surfaces;

electrofusing the first and second pipe engaging electrofusion surfaces of the first and second portions; and electrofusing the second pipe engaging electrofusion surfaces of the first and second portions.

13. The method as defined by claim 12 wherein the apparatus further includes a fastener on at least one of the first and second portions operable to secure the first portion to the second portion, and wherein the method further includes fastening the fastener to secure the first portion to the second portion about the plastic pipe.

14. The method of claim 13 wherein the apparatus further includes an opening in at least one of the first and second portions communicating with the leak in the plastic pipe, and wherein the method further comprises:

testing the leak in the plastic pipe via the opening in the apparatus; and sealably covering the opening in the apparatus.

15. The method of claim 12, further comprising:

sealing the sealable vent.

16. The method of claim 15, further comprising:

providing a repair member on the plastic pipe to reduce the leak, wherein the first and second portions are sized to couple around the plastic pipe so as to encapsulate the repair member and the plastic pipe; and testing the leak in the plastic pipe via the sealable vent.

* * * * *